Sept. 11, 1962  H. E. TEMPLE  3,053,375
DOUGH TREATING APPARATUS CONTROL SYSTEM
Filed June 13, 1960  3 Sheets-Sheet 1

INVENTOR.
HIRAM E. TEMPLE
BY
*Fearmen, Fearmen, & McCulloch*
ATTORNEYS

Sept. 11, 1962 H. E. TEMPLE 3,053,375
DOUGH TREATING APPARATUS CONTROL SYSTEM
Filed June 13, 1960 3 Sheets-Sheet 2
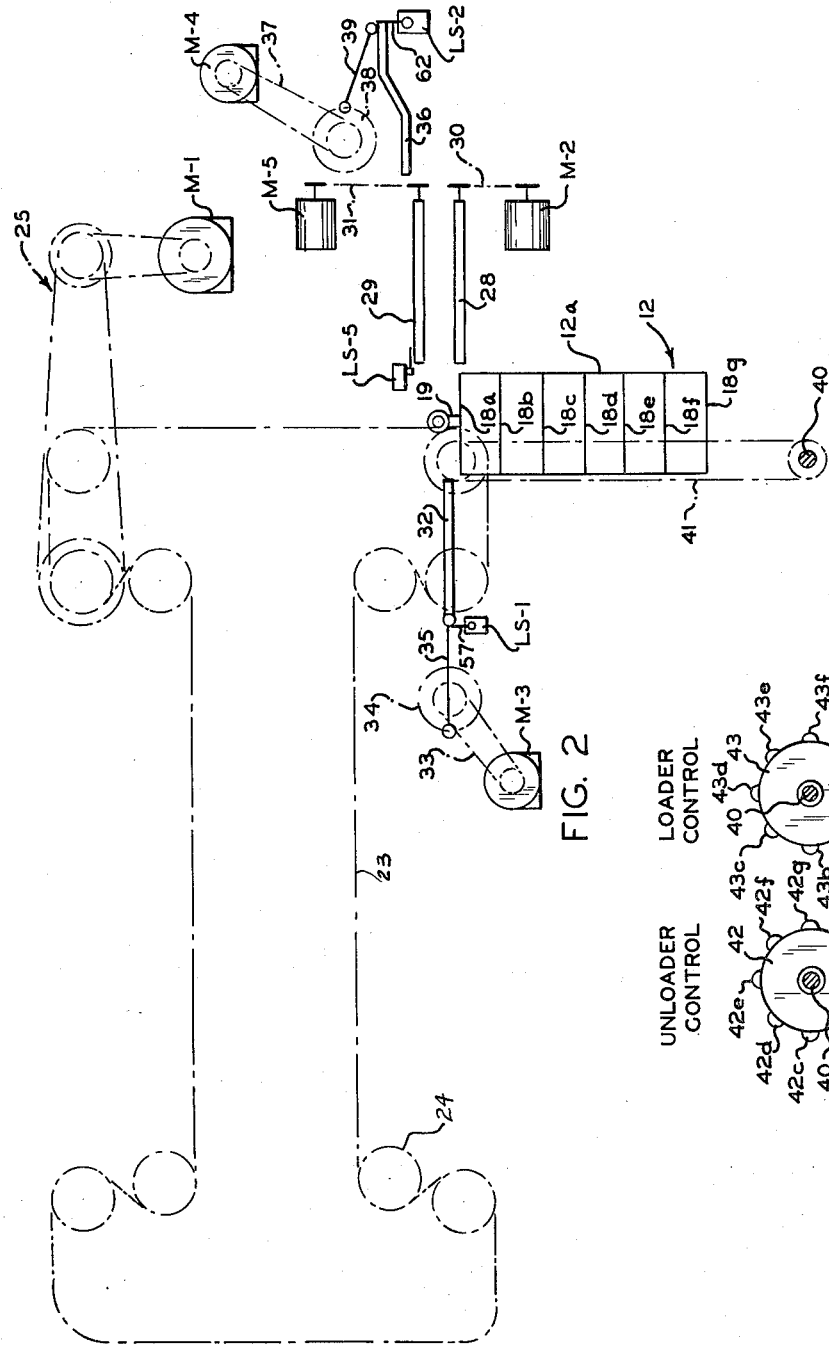

3,053,375
DOUGH TREATING APPARATUS
CONTROL SYSTEM
Hiram E. Temple, Saginaw, Mich., assignor to Baker Perkins Inc., Saginaw, Mich., a corporation of New York
Filed June 13, 1960, Ser. No. 35,582
8 Claims. (Cl. 198—24)

This invention relates to a control system for dough treating apparatus such as proofers and coolers or the like wherein pans of dough to be treated are supported on the shelves of racks which are capable of movement in a path through a housing or chamber from a loading station to an unloading station.

In co-pending application Serial No. 761,130, filed September 15, 1958, there is disclosed dough treating apparatus wherein a plurality of article supporting racks are conveyed through a proofer or cooler chamber and wherein a single pair of conveyor chains effects the movement of all of the racks from a loading station to an unloading station under the influence of a single driving motor. The advantages flowing from the use of a single pair of conveyor chains and a single driving motor are pointed out in detail in the above identified application and need not be restated here, although it will be understood that the use of such a system not only eliminates the need for multiple conveyors and motors but also dispenses with speed synchronization problems attending the use of a plurality of conveyors and drive means.

The invention disclosed herein is concerned primarily with the provision of means for loading and unloading the shelves of racks generally of the kind disclosed in the above identified application and with the provision of control means which function to regulate the operation of the rack conveying apparatus in timed relation to the loading and unloading of the shelves.

An important object of the invention is to provide improved shelf loading and unloading mechanisms for use in conjunction with apparatus of the kind referred to wherein the unloading mechanism and the loading mechanism are operable each time a shelf is presented to the unloading and loading stations, respectively, and wherein the movements of the racks are so controlled that each time a rack is stopped adjacent the loading or unloading station one of its shelves is aligned with either the unloading or loading mechanism.

A further object of the invention is to provide in apparatus of the kind disclosed unloading and loading mechanisms that are capable of simultaneous operation in those instances where there is a shelf at each of the unloading and loading stations.

Another object of the invention is to provide rack loading and unloading control mechanisms which are capable of functioning independently of one another whereby each mechanism operates only when it has its loading or unloading function to perform.

Another object of the invention is to provide control means of the kind described which are simple in construction and reliable in use.

Other objects and advantages of the invention will be pointed out specifically or will become apparent from the following description when it is considered in conjunction with the appended claims and the accompanying drawings, in which:

FIGURE 2 is a diagrammatic view of the apparatus shown in FIGURE 1 with the said rack depicted moving toward the position of FIGURE 1 and illustrating the loading and unloading mechanisms and the loading and unloading conveyors;

FIGURE 3 is an elevational view of a portion of the unloader mechanism control means;

FIGURE 4 is a view similar to FIGURE 3 but illustrating a portion of the loader mechanism control means.

Figure 1:
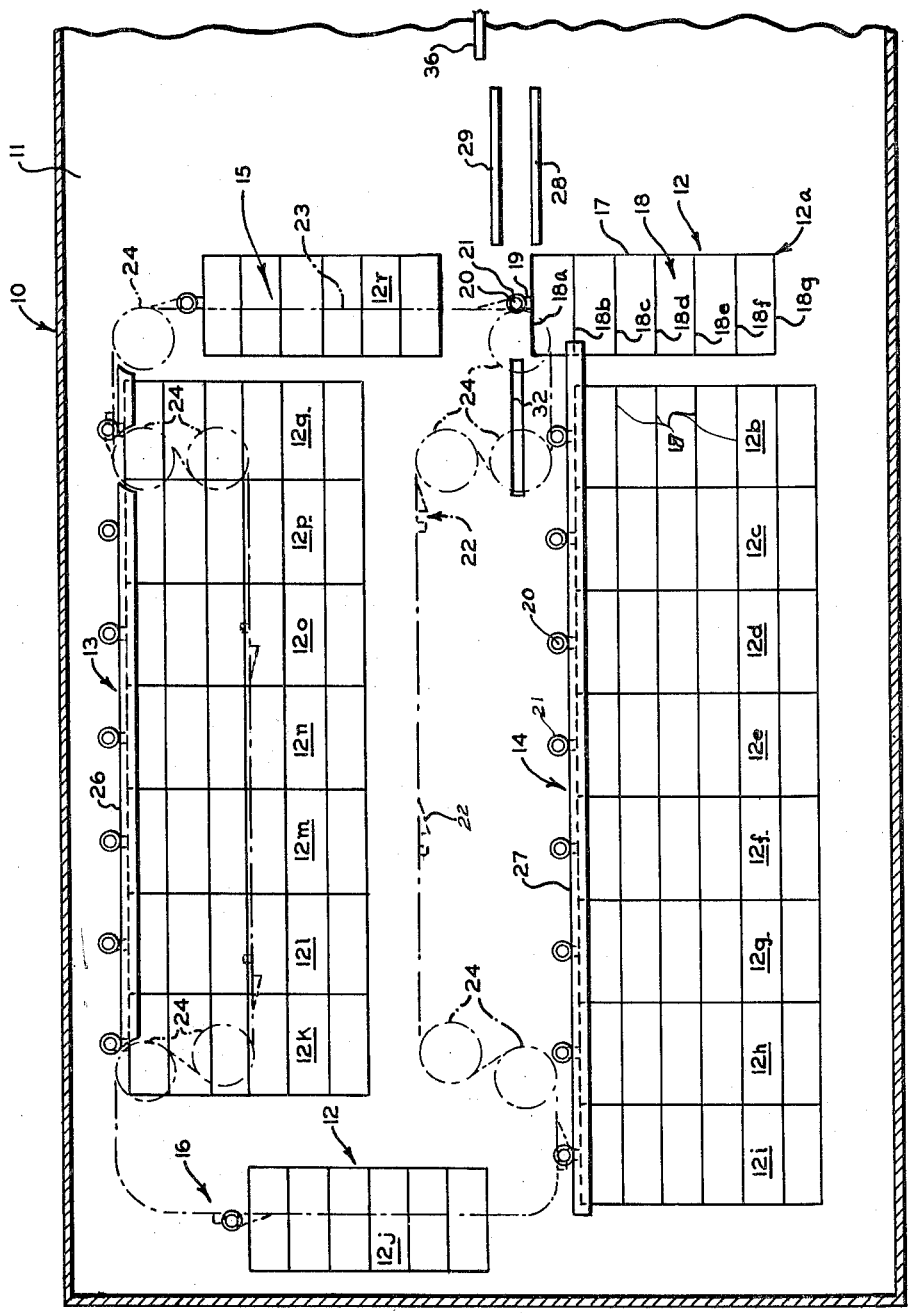
FIGURE 1 is a partly diagrammatic, side elevational view of the inside of a proofer or cooler housing and illustrating generally the apparatus for conveying a plurality of racks from a loading station to an unloading station with the one rack being shown with its upper shelf opposite the unloading conveyor.

Apparatus constructed in accordance with the invention is adapted for use with a proofer or cooler having a housing 10 defining an oblong proofing or cooling chamber 11 through which a plurality of racks generally designated 12 are adapted to be conveyed through a closed loop having upper and lower horizontal runs 13 and 14, respectively, and vertical runs 15 and 16 at the ends of the horizontal runs.

Each rack 12 is identical and comprises side walls 17 between which is secured a plurality of shelves 18. In the illustrative embodiment of the invention each rack 12 is provided with seven shelves numbered 18a through 18g in FIGURES 1 and 2. The width of each rack is, for the sake of convenience, shown to be twice the distance between the shelves 18 approximately.

Each rack 12 may be provided with a pair of supports 19 in each of which is mounted a stub shaft 20. The shafts 20 are shown at the top ends of the racks 12 for the sake of convenience of illustration. On each shaft 20 is journaled a roller 21 and each shaft projects beyond its roller 21 so as to be engageable by lug and latch means 22 that are located at suitable intervals in pairs on a pair of spaced, parallel endless conveyor chains 23 that are trained around sprocket wheels 24 mounted on the frame of the housing 10. The lug and latch devices 22 are adapted to engage the shafts 20 of each rack 12 when the latter reaches an end of either of the horizontal runs 13 and 14 so as to be capable of either lifting or lowering the rack through the vertical runs 15 and 16. The direction of drive of the conveyor chains 23 is such that the racks 12 are lifted vertically in the run 15 and lowered vertically in the run 16. The conveyor chains 23 are driven by an electric motor M-1 (see FIGURE 2) through suitable chain and sprocket mechanism 25 of the kind disclosed in the previously identified co-pending application which also shows mechanism 22.

Eighteen racks 12 constitute a full complement of racks and such racks are numbered successively 12a through 12r (FIGURE 1). Upon operation of the driving motor M-1, a rack in the position of the rack 12r will be lifted through the vertical run 15 and introduced to the horizontal run 13, the confronting faces of the racks 12r and 12q engaging one another. The arrangement of the sprockets 24 is such that the rack 12r will not be released by the latch and lug mechanism 22 immediately upon its introduction to the horizontal run, but instead the rack 12a will be engaged by the mechanism 22 for a sufficient length of time to cause all of the racks on the upper run 13 to be pushed from right to left, as viewed in FIGURE 1, whereupon a rack in the position of the rack 12k will be introduced to the vertical run 16 and lowered to the lower horizontal run 14. In the same manner, a rack in the position of the rack 12j will effect transfer of the racks at the lower run 14 from left to right, as viewed in FIGURE 1, so that a rack in the position of the rack 12b will be introduced to the vertical run 15. The racks 12 are supported in their upper and lower horizontal runs by rails 26 and 27, respectively, on which the rollers 21 ride.

One side wall of the housing 10 is provided with an opening (not shown) to accommodate both a discharge conveyor 28 and a supply conveyor 29. In the disclosed embodiment, the conveyors 28 and 29 are located one above another and they extend sufficiently far into the chamber 11 so as to have a portion of their lengths adjacent the shelves 18 of each rack 12 on the vertical run 15. The zone to the left of the discharge conveyor 28 in FIGURE 1 hereinafter will be referred to as the unloading station and the zone to the left of the delivery conveyor 29 in FIGURE 1 hereinafter will be referred to as the loading zone.

The discharge conveyor 28 is driven by a motor M–2 through conventional chain and sprocket mechanism 30 and the conveyor 28 may comprise either an endless belt, powered rollers, or any other conventional apparatus. The supply conveyor 29 is driven by a motor M–5 through conventional sprocket and chain mechanism 31 and the conveyor 29 may be constructed similarly to the conveyor 28.

Adjacent the unloading station is mounted a reciprocating, unloading pusher member 32 which normally is positioned out of the path of movement of the racks 12, but which is capable of sweeping across a rack shelf 18 at the unloading station and pushing articles from the shelf to the discharge conveyor 28. The means for driving the pusher member 32 comprises a motor M–3 connected by chain and sprocket mechanism 33 to a rotatable wheel 34 to which one end of a crank 35 is pivoted, the other end of the crank 35 being pivoted to the pusher member 32.

Adjacent the loading station is a reciprocating, loading pusher member 36 which normally occupies a position laterally of and slightly above the delivery conveyor 29, but which is movable across the conveyor 29 so as to push goods from the latter onto a rack shelf 18 when a shelf is at the loading station. The loading pusher member 36 is driven by a motor M–4 connected by chain and sprocket mechanism 37 to a rotatable wheel 38 to which one end of a crank arm 39 is pivoted, the other end of the crank arm being pivoted to the pusher member 36.

As is shown in FIGURES 1 and 2, the spacing between the conveyors 28 and 29 corresponds to the spacing between the shelves 18 of each rack 12. Accordingly, it is possible to operate the unloader mechanism 32 and the loader mechanism 36 simultaneously so as to unload a shelf of a rack and at the same time load an empty, upwardly spaced shelf. However, there are two instances where simultaneous operation of the mechanisms 32 and 36 are not desired. The first such instance is indicated in FIGURES 1 and 2 wherein no rack shelf is adjacent the loading station. Where there is no shelf to receive goods from the loading conveyor 29, operation of the mechanism 36 is to be avoided. The other instance referred to is when the lowermost shelf 18g of each rack 18 is located at the loading station. At this time, there will be no shelf at the unloading station, so operation of the unloading mechanism 32 would serve no useful purpose. Each rack carrier 12 is assumed to be a distance equal to twice the distance between the shelves thereof behind the rack directly ahead of it when on the elevator portion 15 of the conveyor chains 23. For the sake of convenience of illustration, however, this factor can be varied.

Apparatus constructed in accordance with the invention controls the operation of the unloading and loading mechanisms so as to permit the latter to operate simultaneously when desired and independently of one another when desired. With previous control systems wherein unloading and loading pusher bars were employed the problem was solved by providing an additional incremental movement of the rack carrier between each unloader and loader operation but this practice had many disadvantages which the present system obviates. It also is desirable that the conveyors 28 and 29 be stationary when goods are loaded to or unloaded from them, and the control system includes means for controlling the stopping and starting of the conveyors in timed relation to the transfer of goods to or from them.

The control means of the present invention includes a rotatable shaft 40 mounted in a convenient place on the housing frame 10 so as to be rotated from one of the sprockets 24 through conventional chain and sprocket mechanism. The arrangement is such that the shaft 40 is rotated only when the motor M–1 drives the conveyor chains 23 and the speed of rotation of the shaft 40 is so so selected as to have a known and define relation to the rate of movement of the racks 12 for a purpose which will become apparent hereinafter.

The control apparatus also includes an unloader control cam 42 mounted on the shaft 40 so as to rotate with the latter and a loader control cam 43 which also is mounted on the shaft 40 so as to rotate therewith. The unloader control cam 42 has seven lobes 42a–42g, each of which is adapted to engage the actuating blade 44 of a multiple contact switch LS–3. The space between any two lobes on the cam 42, beginning with the lobe 42a and moving clockwise to the lobe 42g, is 45°, but the space between the lobe 42g and 42a is 90°. In other words, the cam 42 has a missing lobe.

Figure 5:
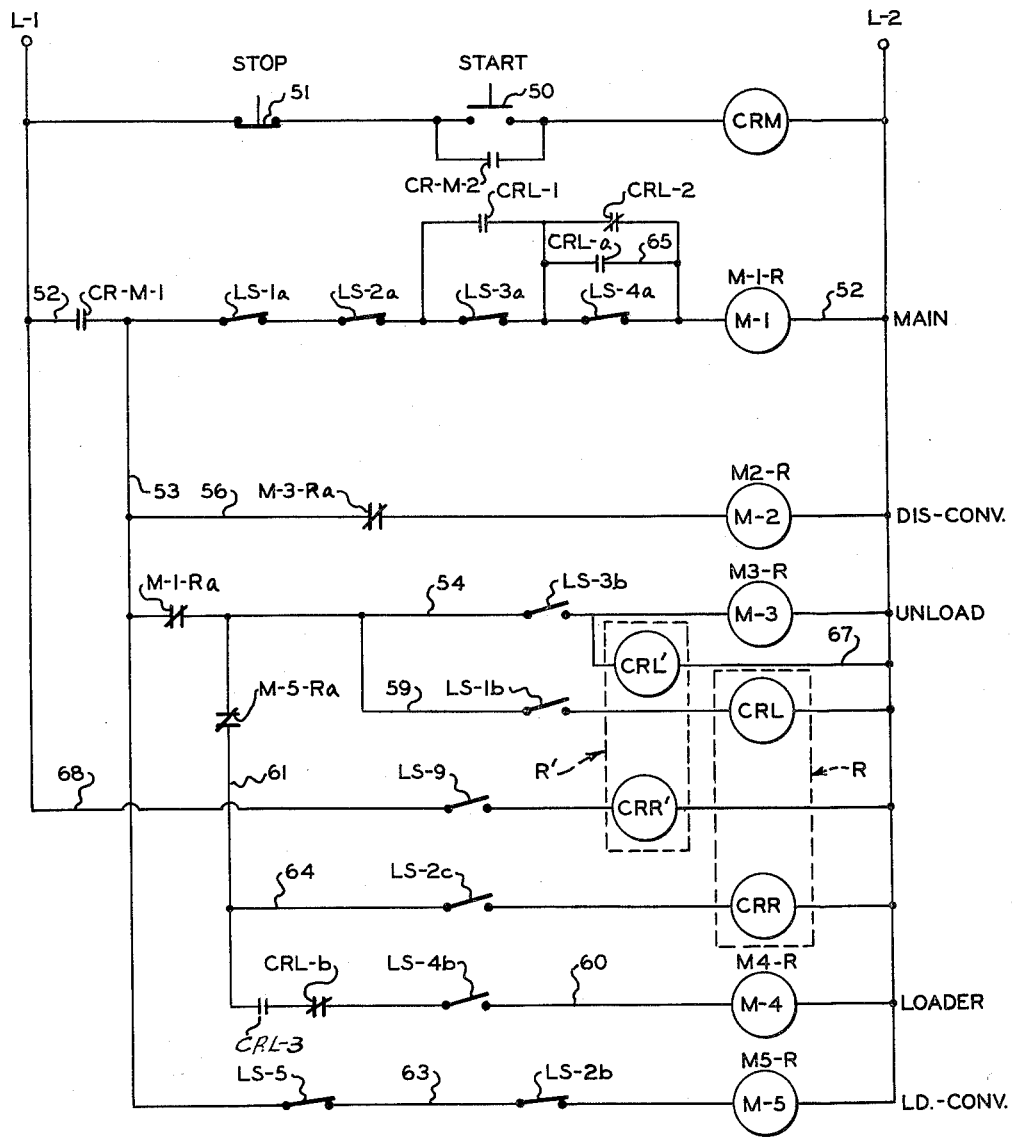
FIGURE 5 is an electrical circuit diagram of the control system.

The cam 43 is similar to the cam 42 in that it has seven lobes, 43a–43g, spaced 45° from one another, except for a 90° space between the lobes 43a and 43g. The cams 42 and 43 are, however, 45° out of phase with one another, as is indicated in FIGURES 4 and 5. Each of the lobes 43a–43g is adapted to engage and actuate the blade 45 of a multiple contact switch LS–4.

The remaining parts of the control apparatus are disclosed in the circuit diagram of FIGURE 5 and the diagram will be explained in conjunction with the operation of the parts described thus far.

When the apparatus is conditioned for operation, let it be assumed that each of the racks 12 located within the housing 10 is loaded with pan sets containing dough or the like, and the apparatus has been stopped with the uppermost shelf 18a of the rack just below conveyor 28 for some reason, as shown in FIGURE 2. Under these conditions, the conveyor driving motor M–1 may be started by closing a starting switch 50 so as to supply electric energy from a source thereof to a master relay CRM that is connected across a pair of power lines L–1 and L–2 through the starting switch 50 and a normally closed stop switch 51. The relay CRM includes normally open contacts CRM–1 connected in a line 52 bridging the power lines L–1 and L–2, the contacts CRM–1 being closed upon energization of the relay coil CRM so as to supply power to a relay M–1–R which controls the starting and stopping of the conveyor drive motor M–1. Thus, the motor M–1 may be started (assuming the line 52 is otherwise closed as it will be in this case) to drive the conveyor 23 and advance the rack 12a upwardly. Normally open contacts CRM–2 of the relay CRM keep the starting switch line closed so long as coil CRM is energized.

As the rack 12a is advanced upwardly to dispose its uppermost shelf 18a opposite conveyor 28 (FIGURE 1) the shaft 40 rotates the slight amount necessary to move the lobe 42a into actuating engagement with the blade 44 of the switch LS–3. The contacts LS–3a of the switch LS–3 are normally closed and disposed in the line 52, but are opened upon actuation of the blade 44 so as to break the circuit to the motor relay M–1–R (relay contacts CRL–1 being open at this time), interrupting operation of the motor M–1 and consequently temporarily disabling the conveyor 23 from operating.

Connected to the line 52 is a line 53 and to the line 53 is connected one end of a line 54 which connects to the line L–2 and in which are connected the normally closed contacts M–1–Ra of the motor relay coil M–1–R; the normally open contacts LS–3b of the switch LS–3;

and a relay M-3-R for controlling the operation of the unloading motor M-3. The contacts M-1-Ra are opened when the relay coil M-1-R is energized, and are closed when the relay is deenergized. Thus, the unloading motor M-3-R cannot operate when the driving motor M-1-R operates.

The contacts LS-3b of the switch LS-3 will be closed upon actuation of the blade 44 by the lobe 42a whereupon the relay coil M-3-R will be energized to drive the motor M-3 and effect a cycle of operation of the unloader arm 32 so as to push goods off the shelf 18a onto the discharge conveyor 28.

When goods are unloaded from one of the shelves of the racks 12 to the discharge conveyor 28, it is preferable that the latter be stationary or, stated differently, that the motor M-2 be disabled from operation. The motor M-2 is controlled by a relay M-2-R in a line 56 connecting the lines 53 and L-2. Also in the line 56 are the normally closed contacts M-3-Ra of the motor relay coil M-3-R, the contacts M-3-Ra being closed when the unloader motor M-3 is idle, but open when the motor M-3 operates. Thus, upon energization of the relay coil M-3-R to drive the motor M-3, the contacts M-3-Ra open so as to interrupt operation of the discharge conveyor motor M-2.

The unloader member 32, in its inactive position, engages the actuating blade 57 of a multiple contact switch LS-1. When the pusher member 32 begins an unloading cycle, the blade 57 is released so that the normally open contacts of the switch LS-1 are closed and the normally closed contacts of the switch LS-1 are opened. One pair of the normally closed contacts of the switch LS-1 are the contacts LS-1a in the line 52 and these contacts open at the beginning of a cycle of operation of the mechanism 32. The opening of the normally closed contacts LS-1a assures disabling of the conveyor driving motor M-1 until such time as the unloader 32 returns to its position out of the path of the rack 12.

The switch LS-1 also includes normally open contacts LS-1b in a line 59 connected at one end to the wire 54 and at the other end to the power line L-2 through the latching coil CRL of a mechanical latching relay R. The release of the blade 57 of the switch LS-1 by the pusher arm 32 closes the contacts LS-1b so as to energize the relay latching coil CRL. The coil CRL has pairs of contacts CRL-1 and CRL-2, normally open (when unlatched) contacts CRL-1 bridging the contacts LS-3a (line 52) and the normally closed (when unlatched) contacts CLR-2 paralleling normally closed limit switch contacts LS-4a which will be mentioned further.

When the arm 32 returns to its inactive position at the completion of a cycle of operation, the switch LS-1 is actuated by the arm so that the contacts LS-1a close and the contacts LS-1b open. However, since the relay R is a mechanical latching relay, the contacts CRL-1, which parallel the contacts LS-3a in the line 52, remains open. The manner in which energy is once again supplied to the motor relay M-1-R at this time through contacts CRL-a, whereupon the conveyor 23 again will be driven, causing rotation of the cam 42 to a position such that the lobe 42a releases the blade 44 of the switch LS-3, will be later described in detail. The mechanical latching relay R can be the one manufactured by the Clark Controller Co. as its 5 UH K4 model. For the present it is sufficient to recognize that the conveyor 23 is driven so as to advance the rack 12a upwardly until such time as the cam lobe 42b engages the switch blade 44. At this time the shelf 18b will be loccated at the unloading station and the unloading mechanism again will be actuated in the manner just described to move goods from the shelf 18b onto the discharge conveyor 28.

Due to the corresponding spacing between the shelves of the racks 12 and the spacing between the conveyors 28 and 29, the empty shelf 18a will be at the loading station when the shelf 18b is at the unloading station. Moreover, since the shaft 40 will have been rotated an amount sufficient to cause the lobe 42b to engage the switch blade 44, the cam lobe 43a of the cam 43 also will have been rotated a distance sufficient to cause it to engage and actuate the blade 45 of the switch LS-4.

Actuation of the switch blade 45 opens normally closed contacts LS-4a in the line 52 leading to the motor control relay M-1-R. It will be clear that at this time both pairs of switch contacts LS-3a and LS-4a are open, but it is the opening of the contacts LS-4a and CRL-a which stops the motor M-1 inasmuch as the contacts CRL-1 are mechanically held closed. Other normally open contacts LS-4b of the switch LS-4 are located in a line 60 which contains a relay M-4-R for controlling the loading mechanism motor M-4. The line 60, which connects at one end to power line L-2, is connected to the line 54 by a line 61. The arrangement is such that, when the conveyor drive motor relay M-1-R is deenergized and the contacts LS-4b are closed, a circuit can be completed to the loading mechanism control motor M-4-R through the contacts LS-4b so as to initiate driving of the motor M-4 and begin a cycle of operation of the loader pusher member 36.

In its inactive position, the loader member 36 engages a blade 62 of a multiple contact switch LS-2. Upon the beginning of the cycle of operation of the pusher member 36, the blade 62 is released thereby opening normally closed contacts LS-2a in the line 52 connected to the motor control relay M-1-R and, also, opening normally closed contacts LS-2b in a line 63 connected across the line 53 and the power line L-2 and containing a normally closed switch LS-5 and a relay M-5-R for controlling the loading conveyor motor M-5. Opening of the contacts LS-2b breaks the circuit to the motor control relay M-5-R so as to interrupt operation of the loading conveyor M-5.

The switch LS-5 is mounted adjacent the loading conveyor 29 in the path of goods delivered to the loading station and is engaged and opened by the goods when they arrive at the loading station. Thus, the driving of the loading conveyor 29 initially is interrupted by the arrival of goods at the loading station, but interruption of the conveyor for the operation of the conveyor 29 for the complete cycle of operation of the mechanism 36 is assured once the loader mechanism begins operation, by the opening of the contacts LS-2b. Once the goods have been transferred from the conveyor 29 to a shelf of a rack 12, the switch LS-5 automatically closes.

The switch LS-2 contains normally open contacts LS-2c in a line 64 connected across the lines 61 and L-2 and in which also is mounted the release coil CRR of the mechanical latching relay R. When switch LS-2c is closed upon the pusher bar 36 disengaging from switch LS-2, coil CRR is energized to open (unlatch) normally open contacts CRL-1 and close normally closed contacts CRL-2 which bridge the contacts LS-4a of the switch LS-4 in the line 52.

As long as the contacts LS-2a remain open, it is impossible for the conveyor drive motor M-1 to start. Consequently, disabling of the operation of the conveyor 23 is assured until such time as the pusher member 36 is restored to its inactive position out of the path of the goods which otherwise might be delivered to the loading station from the conveyor 29. Moreover, the loading conveyor motor M-5 will be disabled until such time as the pusher member 36 is restored to its inactive position inasmuch as the contacts LS-2b will remain open until the arm 36 is fully retracted.

As has been indicated above, restoration of the pusher mechanisms 32 and 36 to their inactive positions after both have operated simultaneously enables a circuit to be completed to the main motor control relay M-1-R through the contacts CRL-1 and CRL-a, despite the fact that both pairs of contacts LS-3a and LS-4a remain open. Upon reenergization of the relay M–1–R, the driving motor M–1 is enabled to drive the conveyor so as to permit the switch blades 44 and 45 to be released by their respective cam lobes.

In the operation just described, the shelves 18b and 18a were unloaded and loaded, respectively, simultaneously, thereby requiring only one stop of the conveyor 23. The simultaneous operation of the unloading and loading mechanisms will continue until such time as the shelf 18g is located at the loading station. Since the shelf 18g is the lowermost shelf of the rack, there will be no shelf at the unloading station and consequently there is no need for operating the unloading mechanism. It is for this reason that the cam 42 has a missing lobe.

By the time the rack shelf 18g reaches the loading station, the cam lobe 43g will be activating the blade 45 of the switch LS–4, but the cam 42 will have been rotated to a position such that the blade 44 of the switch LS–3 is in the 90° space between the cam lobes 42a and 42g. Consequently, the switch LS–3 is not actuated and no operation of the unloading device 32 takes place. Actuation of the switch LS–4, however, effects momentary interruption of the driving motor M–1 and operation of the loading mechanism 36 in exactly the same manner as has previously been described. At the end of a cycle of operation of the pusher member 36, the switch LS–2 again will be actuated so as to close the contact LS–2a in the line 52. Since the switch LS–3 was not actuated, the contact LS–3a will be closed so as to permit a circuit to be made through the latter and the contacts CRL–2 which are closed since coil CRL of the relay R was not energized (limit switch contacts LS–1b remaining open because the unloader pusher 32 did not operate).

The relay contacts CRL–a of a second mechanical latching relay R' are connected in a line 65 paralleling the limit switch contacts LS–4a. The relay R' which is preferably identical with the relay R previously described includes a latching coil CRL', contacts CRL–a and CRL–b, and a release coil CRR'. The contacts CRL–b are connected in line 60 to prevent a double loader operation in the event a drive slip clutch which is employed but forms no part of the invention should slip with the drive stopped in load position. Contacts CRL–b are open when latched by the latching coil CRL' which is connected in line 67 parallel to the unloader motor relay coil M3–R. Contacts CRL–a are closed when latched by the coil CRL' and energization of the release coil CRR' in a line 67 connected between power lines L–1 and L–2 operates to restore the contacts CRL–a and CRL–b, of course. The normally open limit switch LS–9 which is located as shown in FIGURE 3 with its switch blade 68 in position to be engaged by the lobes 43a–43g is in series with the release coil CRR'. This switch LS–9 is located substantially 45° ahead of switch LS–3 and is closed by the unloader lobes 42a–42g after each has released LS–3. In order for the loader motor M–4 to be operated the switch LS–9 must be closed since contacts CRL–b when latched are open.

The invention is concerned with the concept of providing a circuit line 65 in the circuit of the type shown which parallels the relay contacts CRL–2 and includes contacts CRL–a which transmit current to the motor M–1 at a time when the upper shelf 18a is opposite the loader conveyor 28 and the loader pusher 32 has removed the pans to shelf 18a and returned to position. At this time relay coil CRL has latched contacts CRL–2 which are open. Since the loader pusher 36 was not operated, switch LS–2c remained open and release coil CRR was not operated. The circuit is made through contacts LS–3a of limit switch LS–3 (once the pusher 32 has returned to retracted position) and contacts CRL–a, and motor M–1 is operated to index the rack carrier upwardly one notch to dispose shelf 18a opposite the loader conveyor 29. The limit switch 9 is closed by the lobe 42a when the shelf 18a is substantially level with conveyor 29 and coil CRR' is energized to unlatch the contacts CRL–a. At this same time contacts M–1–Ra and LS–3b close, the contacts LS–3b being closed when lobe 42b actuates LS–3 switch blade 44, so that unloader motor M–3 can operate. Also contacts CRL–b are unlatched and closed and contacts LS–4b are closed by lobe 43a actuating switch blade 45 of switch LS–4 so that the loader motor M–4 can operate. Operation thence proceeds in the manner described. Normally closed contacts M–5–Ra of the loader conveyor relay M5–R and normally open contacts CRL–3 (when unlatched) of the latching relay CRL are safeties. Contacts CRL–3, for instance, prevent starting of the loading motor until after the unloader has latched relay CRL and contacts M–5–Ra prevents operation of the loader if the loader conveyor motor M–5 is operating.

The disclosed embodiment is representative of a presently preferred embodiment of the invention, but is intended to be illustrative rather than definitive thereof. The invention is defined in the claims.

I claim:

1. In dough treating apparatus of the kind having a housing in which a plurality of article supporting racks are capable of movement in a circuit past a rack loading station and a rack unloading station, each of said racks having a plurality of equally vertically spaced shelves on which articles may be loaded and unloaded, loading conveyor means for delivering articles to be loaded on said racks to said loading station, discharge conveyor means at said unloading station for receiving articles discharged from said racks, said loading conveyor means and discharge conveyor means having conveying surfaces vertically spaced a distance equal to the distance between the shelves of said racks, loading means at said loading station for loading articles on said racks from said loading conveyor means, unloading means at said unloading station for unloading articles from said racks to said discharge conveyor means, the combination of drive means normally enabled to move said plurality of racks through said circuit and presenting each of the shelves of said racks sequentially to said unloading station and to said loading station; drive control means for momentarily disabling said drive means when a shelf of any of said racks is at said unloading station and a shelf of any of said racks is at said loading station; unloading control means connected to said unloading means operable at the arrival of a shelf at said unloading station to effect operation of said unloading means; loading control means connected to said loading means operable to effect operation of the latter at the arrival of a shelf at said loading station, said unloading control means and said loading control means being effective to operate said unloading means and said loading means simultaneously when a shelf is at each of said unloading and said loading stations; and drive enabling means operable at the completion of each operation of either of said loading means and said unloading means for reenabling said drive means after each momentary disabling of the latter.

2. In dough treating apparatus of the kind having a housing in which a plurality of article supporting racks are capable of movement in a closed loop past a rack loading station and a rack unloading station, each of said racks having a plurality of vertically spaced shelves on which articles may be loaded and unloaded, loading conveyor means for delivering articles to be loaded on said racks to said loading station, discharge conveyor means at said unloading station for receiving articles discharged from said racks, loading means at said loading station for loading articles on said racks from said loading conveyor means, unloading means at said unloading station for unloading articles from said racks to said discharge conveyor means, the combination of drive means normally enabled to move said plurality of racks through said loop and presenting each of the shelves of said racks sequentially to said unloading station and to said loading station; drive control means for momentarily disabling said drive means when a shelf of any of said racks is at said unloading station and a shelf of any of said racks is at said loading station; unloading control means connected to said unloading means operable in response to the arrival of a shelf at said unloading station to effect operation of said unloading means; loading control means connected to said loading means operable to effect operation of the latter in response to the arrival of a shelf at said loading station, said unloading control means and said loading control means being effective to operate said unloading means and said loading means simultaneously when a shelf is at each of said unloading and said loading stations; and drive enabling means operable in response to the completion of each operation of either of said loading means and said unloading means for reenabling said drive means after each momentary disabling of the latter.

3. In dough treating apparatus of the kind having a housing in which a plurality of article supporting racks are capable of movement in a circuit having an elevator portion leading past a superposed rack loading conveyor means and a rack discharge conveyor means, each of said racks having a plurality of vertically spaced shelves on which articles may be loaded and unloaded, said loading conveyor means and discharge conveyor means having conveying surfaces vertically spaced a distance equal to the distance between said shelves; loading means for loading articles on said racks from said loading conveyor means; unloading means for unloading articles from said racks to said discharge conveyor means; an electrical power source; drive means including a first motor in a line connected across said source normally enabled to move said plurality of racks through said circuit and presenting each of the shelves of said racks sequentially to said discharge conveyor means and to said loading conveyor means; an unloading means movement controlling first cam driven by said first motor; a loading means movement controlling second cam also driven by said motor; a switch means actuated by said first cam and a second switch means actuated by said second cam, in series in said line, either of said switch means being operable for momentarily disabling said drive means when a shelf of any of said racks is at said discharge conveyor means or a shelf of any of said racks is at said loading conveyor means; unloading control means including a second motor connected with said source associated with said unloading means and operable in response to the arrival of a shelf at said discharge conveyor means to effect operation of said unloading means; loading control means including a third motor connected to said source associated with said loading means and operable to effect operation of the latter at the arrival of a shelf at said loading conveyor means, said unloading control means and said loading control means being effective to operate said unloading means and said loading means simultaneously when a shelf is at each of said discharge conveyor means and said loading conveyor means; a circuit in parallel with said second switch means including contacts normally open but closable to connect the source and first motor when said second switch means is open; and drive enabling means, including means for closing said contacts, operable at the completion of each operation of either of said loading means and said unloading means for reenabling said drive means after each momentary disabling of the latter.

4. The combination defined in claim 3 in which said means for closing said contacts comprises a mechanically latched relay with a latching coil and a release coil, and a circuit for the latching coil having switch means closed by the first cam to permit energization of the coil.

5. The combination defined in claim 4 in which a parallel circuit including said unlatching coil is energized by switch means actuated by said first cam.

6. The combination defined in claim 3 in which said cams each have the same number of lobes as the racks have product supporting shelves in use with the first and last lobes spaced twice the distance of the spacing between the other lobes, the first lobes of said cams being one lobe out of phase.

7. The combination defined in claim 3 in which a circuit in parallel with said first switch means includes normally open contacts which can be closed to bypass said first switch means; and means for closing said normally open contacts comprises a relay actuated by the first cam.

8. The combination defined in claim 5 in which said relay has a second set of contacts in said loading means control circuit.

References Cited in the file of this patent

UNITED STATES PATENTS

| | | |
|---|---|---|
| 2,823,811 | Temple | Feb. 18, 1958 |
| 2,866,565 | Temple | Dec. 30, 1958 |